Figure 1:
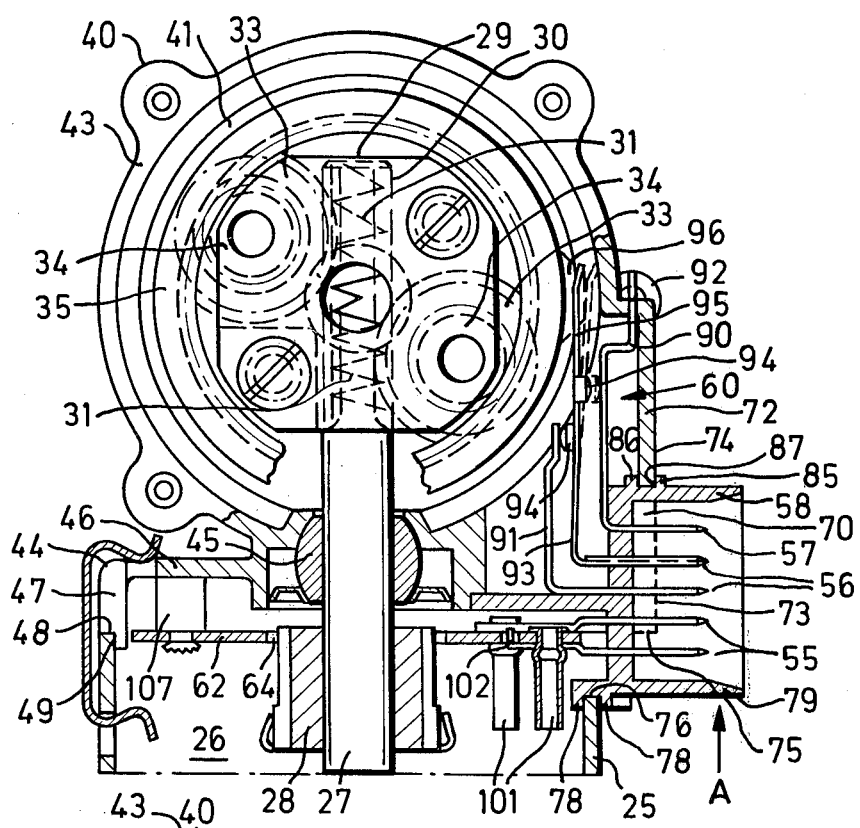

United States Patent [19]

Busch et al.

[11] 4,398,135
[45] Aug. 9, 1983

[54] WINDSHIELD WIPER ELECTRIC DRIVE UNIT

[75] Inventors: Gerhard Busch, Besigheim; Heinz Jakob, Bietigheim-Bissingen; Reiner Jendrzejewski, Murr; Heribert Klement; Hans Prohaska, both of Bietigheim-Bissingen; Eckhardt Schmid, Brackenheim; Theodor Schneider, Freudental, all of Fed. Rep. of Germany

[73] Assignee: ITT Industries, Inc., New York, N.Y.

[21] Appl. No.: 264,664

[22] Filed: May 18, 1981

[30] Foreign Application Priority Data

Jun. 12, 1980 [DE] Fed. Rep. of Germany ....... 3021948

[51] Int. Cl.³ .................. H01R 39/58; H07K 15/00
[52] U.S. Cl. .................................. 318/443; 310/71; 310/239; 310/249
[58] Field of Search ................. 318/443–444, 318/467–468, DIG. 2; 15/250.12, 250.13, 250 R; 310/239–241, 248–251, 15, 42, 91, 71, 68

[56] References Cited

U.S. PATENT DOCUMENTS

| | | | |
|---|---|---|---|
| 3,132,366 | 5/1964 | Brooks | 310/239 |
| 3,842,302 | 10/1974 | Apostoleris | 310/249 |
| 4,056,749 | 11/1977 | Carlson, Jr. et al. | 310/71 |

*Primary Examiner*—J. V. Truhe
*Assistant Examiner*—A. Evans
*Attorney, Agent, or Firm*—James B. Raden; William J. Michals

[57] ABSTRACT

An electric motor drive unit for windshield wipers includes an electric motor having an electrical connection plug housing and a brush holder plate. The plug housing and brush holder plate are provided as an integral unit. The unit is secured between the motor housing and the gear housing. This arrangement and assembly of the drive unit is simplified and less expensive to manufacture.

4 Claims, 19 Drawing Figures

Fig. 7

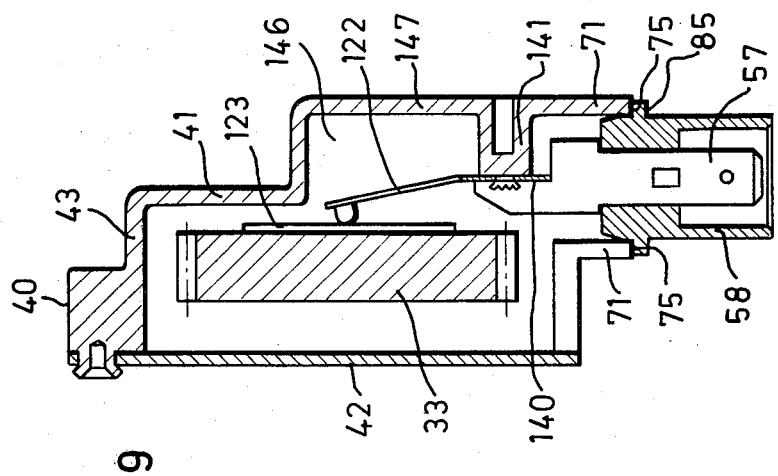
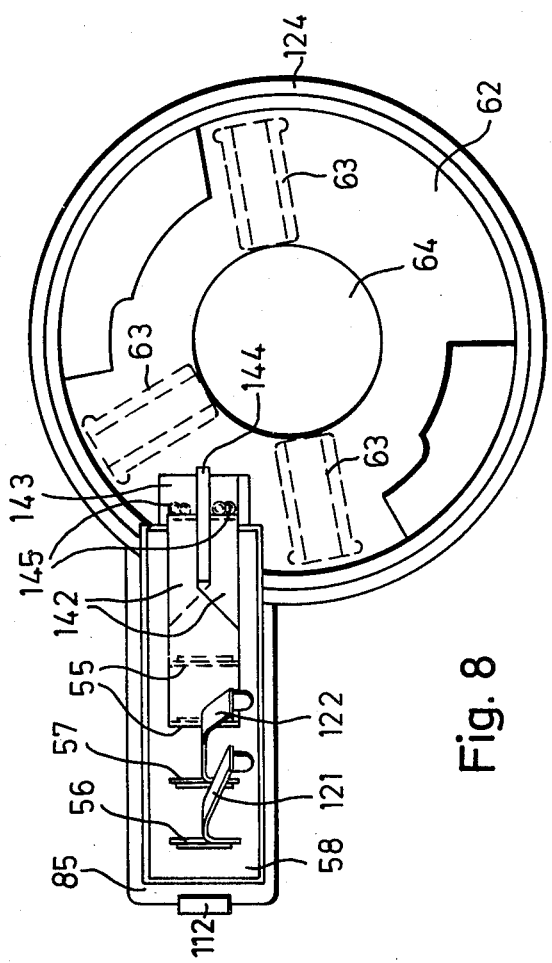

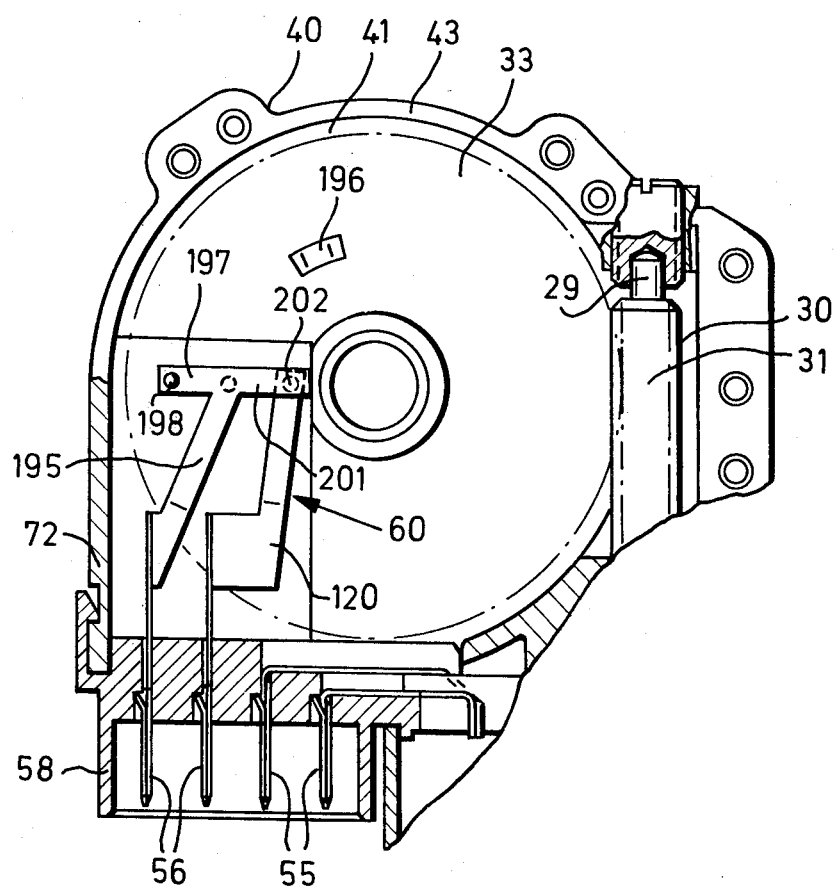

WINDSHIELD WIPER ELECTRIC DRIVE UNIT

This invention starts from an electric drive unit known from the DE-OS No. 19 00 185 in which the use of this unit is adapted for driving windscreen wipers of a motor vehicle. Thereby the rotational speed of the shaft of an electric motor accomodated in a cup-shaped housing is reduced by a worm-gear drive to a rotational speed suitable for moving the wipers. The gear is located in a gear housing with a substantially rounded external form. To a plane plate, which covers one front face of the gear housing, a plug housing of plastic material is moulded; on the inner side of the portion formed on said plug housing three brush springs are fixed. Said brush springs are connected with plugs in the plug housing in an electrically conductive manner and with a conductive strip secured on the driven wheel of the gear form a limit switch or a parking position switch for the drive unit.

On the gear housing, and that on an end shield closing the front surface of the motor housing facing the gear, beside the plug housing a plate is fixed too, which carries the brush holders and the brushes for the collector of the electric motor. Brush holder plate and plug housing are thus separately produced and separately mounted. Such a method of production is time-consuming and expensive.

It is the object of the present invention to improve an electric drive unit in such a way that the production of the piece parts and their assembly becomes simpler and cheaper. In this connection it has to be observed that the improvement of the drive unit does not result in the fact that other important requirements for such a drive unit are complied with to a smaller extent. So for instance all mounted parts are to be held securely on the housings. Furthermore a design as space-saving as possible and a good packing of the drive unit is to be ensured.

In an electric drive unit this problem is solved according to the invention in that this unit is additionally equipped with the features of the characterising part of the main claim.

Thus an electric drive unit according to the invention is developed in such a way that the plug housing and the brush holder plate as a combined constructional unit can be easily mounted. Thereby the constructional unit can be equipped with the various current supply elements and with the end position control of the electric motor. Also the connections between these elements can already be made. Due to the special development of the gear housing the equipped constructional unit can then be easily pre-mounted on it. When motor housing and gear housing are connected said constructional unit is finally reliably secured.

The electric drive unit according to the invention can advantageously be further developed by providing it with features of the subclaims. Thus by a version the receptacle of the constructional unit including plug housing and brush holder plate is especially simply formed. This is above all of importance, if the gear housing is produced in a casting process. How a lot of space is available for the constructional unit and the electric elements on it. It is possible to produce plug housing and brush holder plate separately at first and then combine it to a constructional unit. Plugs can serve as a connection. However it is more favourable, if plug housing and brush holder plate are formed in one piece of plastic material.

Features which advantageously develop the electric drive unit with respect to reliably holding the constructional unit provided with plug housing and brush holder plate and with respect to a good packing of the gear and motor housings. So for instance on the jacket of a gear housing with a rounded jacket surface walls directed to the outside are formed whose front faces are located in a common plane. Thereby a plane opening for the plug housing is created. The plug housing rests upon the front faces of the walls on the gear housing with a projecting flange. Because of the plane surfaces a close fit is thereby achieved much more easily than with a bent flange for the rounded jacket of the gear housing. The further developments effect an additional bracing of the constructional unit. By this bracing above all the plug housing is secured in its position, and that mainly in direction of the forces acting upon it, when a socket housing is slipped on it or pulled off from it.

The plugs can be advantageously arranged in the plug housing and which position the constructional unit can suitably occupy with respect to the gear and motor housings. So for example the gear housing of gears with a sole worm and a worm wheel mating with it indeed joins the motor housing. It can however be to a far extent laterally staggered with respect to the motor housing. In order to prevent that the drive unit does not additionally become broader in this direction it is advantageous, when according to claim 16 the plug housing is seated at about the level of the brush holder plate mainly laterally of the motor housing and below the gear housing. Thereby the plugs are extending preferably in parallel to the motor housing. If the gear is built up in such a way that the gear housing is substantially located in the imagined lengthening of the motor housing, in order to save space it is more favourable if the plug housing is laterally arranged on the gear housing and its longitudinal direction at least approximately corresponds to the longitudinal direction of the motor housing. Thereby the plugs are preferably standing vertical on the longitudinal direction of the motor housing.

A gear which is built up in such a way that it is possible that the gear housing is mostly located in the imagined lengthening of the motor housing is for instance a double worm-gear drive with two opposed worms, two worm wheels on different sides of the worm shaft and a common driven wheel. In known double worm-gear drives the driven wheel is located on the side of a plane not facing the motor housing and being defined by the two axes of rotation of the worm wheels. In order to be able to achieve in such a gear a connection between the switch contacts of the limit switch, which co-operate with the driven wheel, and the corresponding plugs in the plug housing, and said connection is as simple as possible, in one embodiment of an electric drive unit according to the invention the driven wheel is built in according to claim 20 on that side of the already defined plane on which the motor housing is located too. The switch contacts, which moreover can as well be developed as brush springs gliding on a conductive strip as also as changeover contacts directly interacting, now can be easily held directly on the constructional unit like in a simple worm-gear drive without having to be extraordinarily long.

The invention includes measures by which the limit switch of the electric drive unit can be developed in such a way that it becomes also less complicated. The switch contacts are advantageously developed in one piece with the corresponding plugs in the plug housing. In order to save a switch contact the negative potential for the end position of the electric motor is directly tapped off from the gear housing by a cam-controlled resilient switch contact, if said gear housing is applied to ground potential, and no longer via a separate switch contact.

In comparison to known limit switches or parking position switches, in which one brush spring is applied to the positive terminal and one brush spring to the negative terminal and the differing potentials of a spring continuously sliding on a conductive strip are conducted via the conductive strip, in addition the angle from switching off the positive potential to switching on negative potential is reduced, so that the parking position can be defined more exactly. The invention advantageously develop an electric drive unit in which the ground potential is directly tapped off from the gear housing. Thereby above all a good and reliable contact-making is to be achieved. The limit switch is only built up with changeover contacts without a conductive strip.

On the brush holder plate in addition to the brushes and brush holders also electric components for interference suppression of the electric motor. These parts can be advantageously arranged and the electric components can in a simple way be connected with the corresponding plugs. In addition the pigtails no leads are necessary for connecting the brushes with the plugs.

An electric drive unit according to the invention are included to which an electronic circuit arrangement belongs which for instance helps to operate the electric motor intermittently. In order to be able to replace this electronic circuit arrangement easily, because it is especially sensitive to environmental influences, it is reasonable to accomodate it in a separate housing which is located outside on the drive unit. Said housing can in one place be designed like a socket housing, so that it is possible to slip it on the plug housing. The electronic circuit arrangement can, however, be also located in the gear housing, when a breakdown within the service life of the drive unit is hardly to be expected, when the electronic circuit arrangement is for instance accomodated in a place protected against environmental influences. The printed circuit board on which the electric and electronic components are secured are suitably arranged in parallel to the driven wheel in the gear housing. Then also the switch contacts and brush springs respectively can be secured on said printed circuit board.

Figure 2:
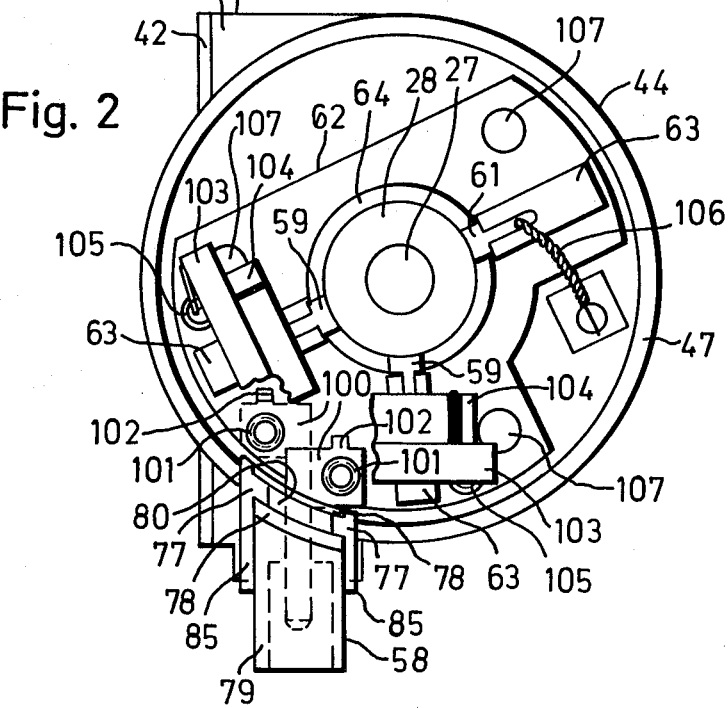
Figure 3:
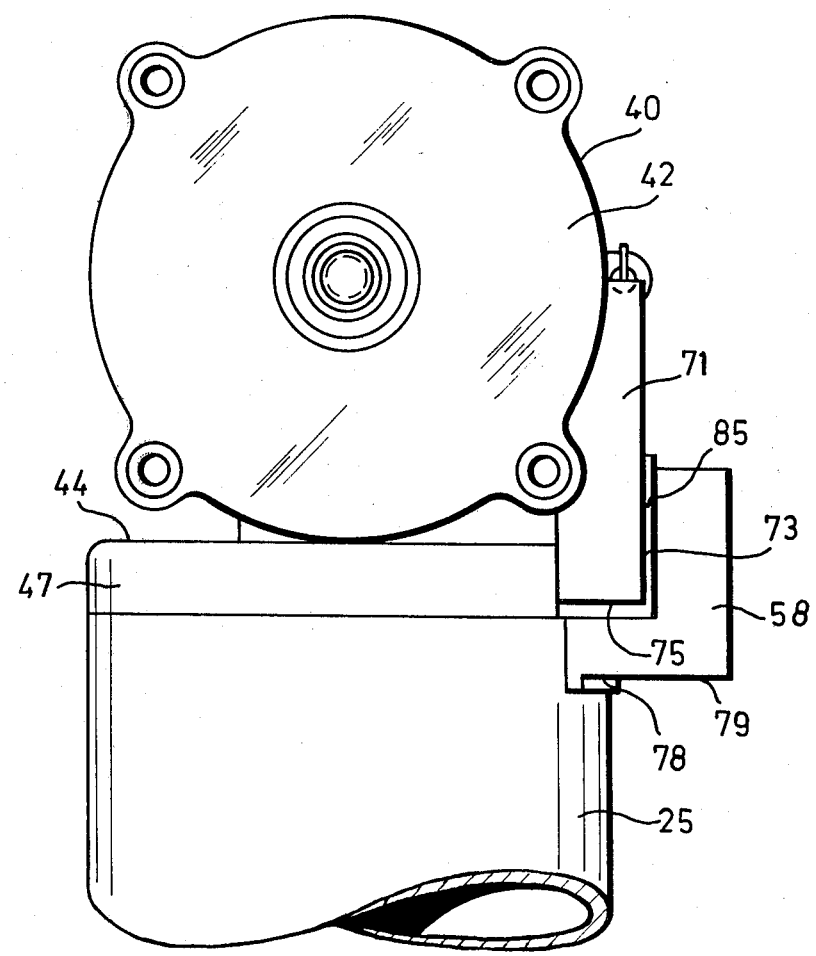
Figure 4:
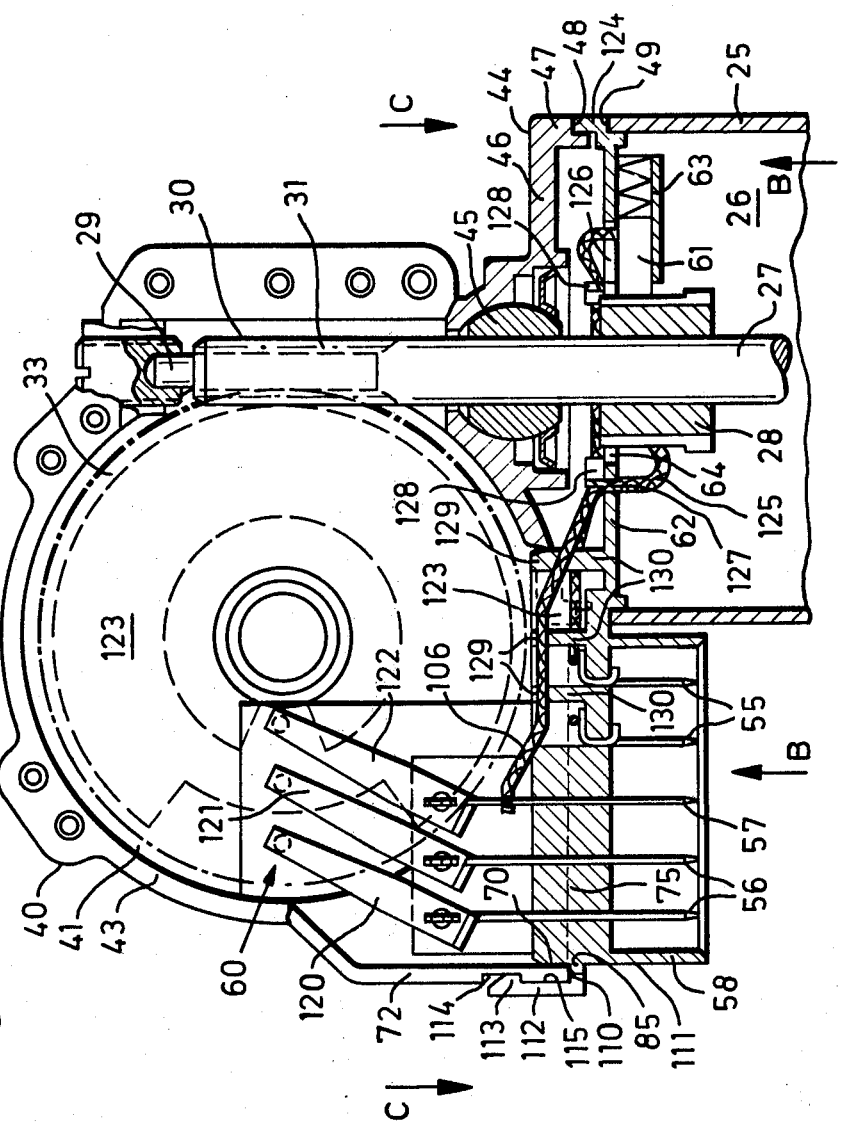
Figure 5:
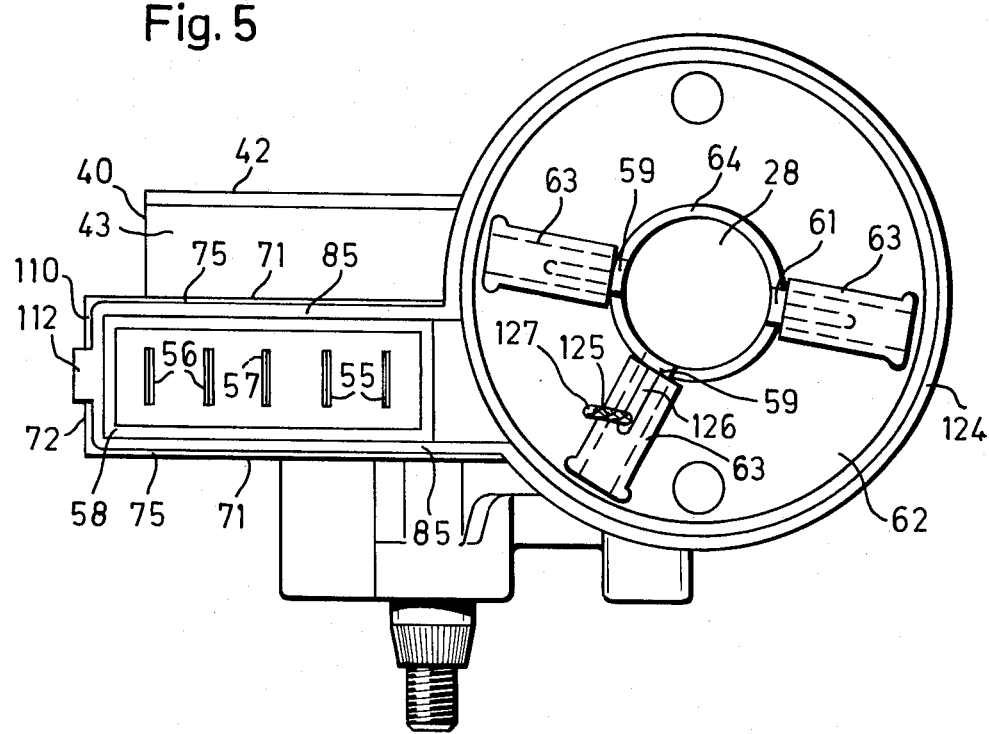
Figure 6:
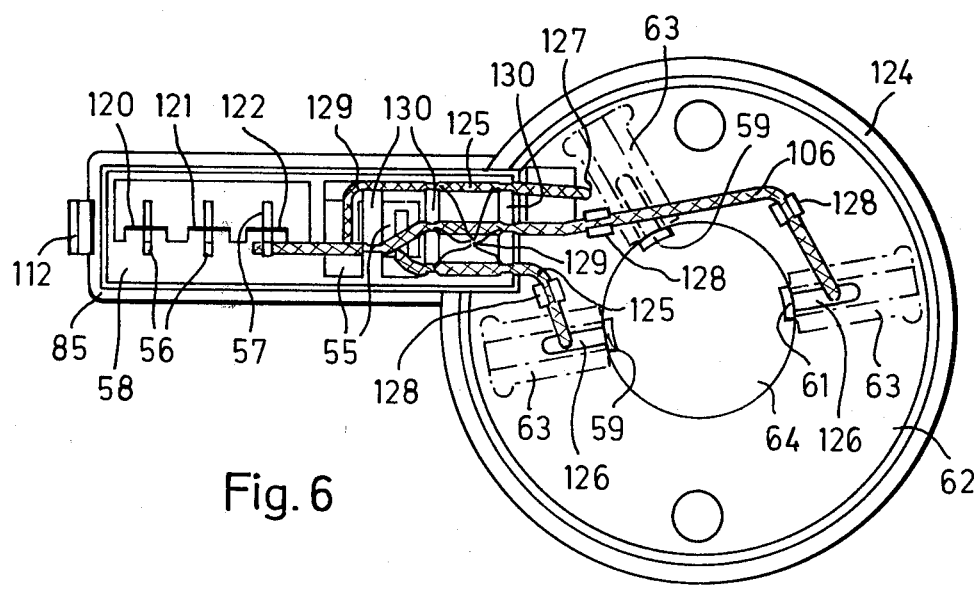
Figure 10:
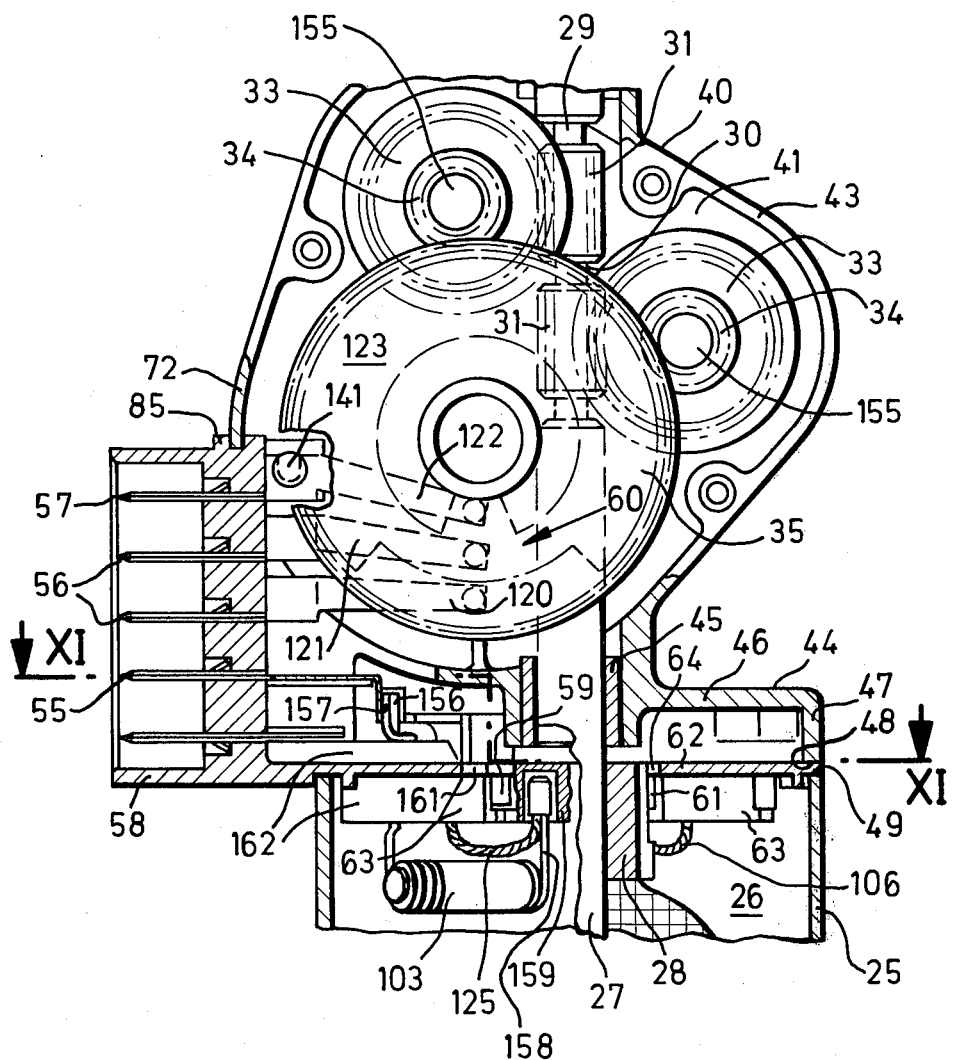
Figure 11:
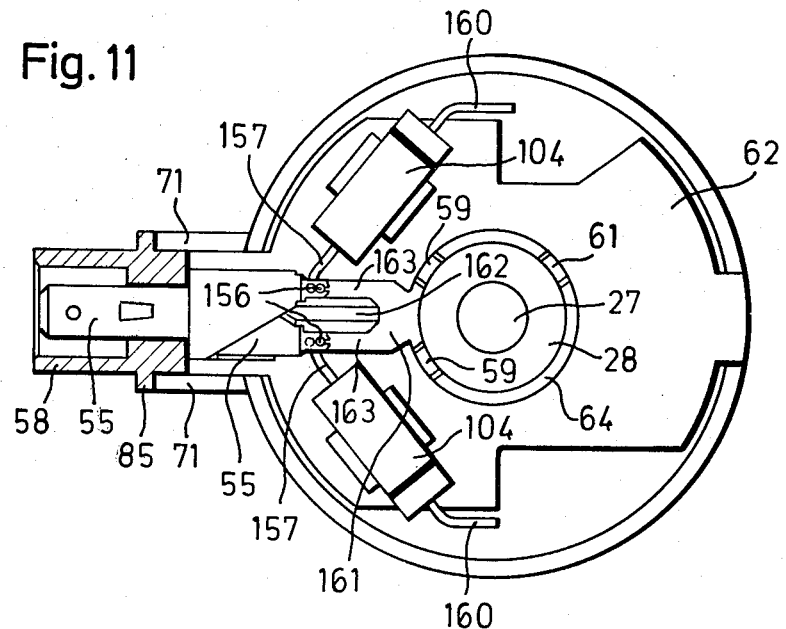
Figure 12:
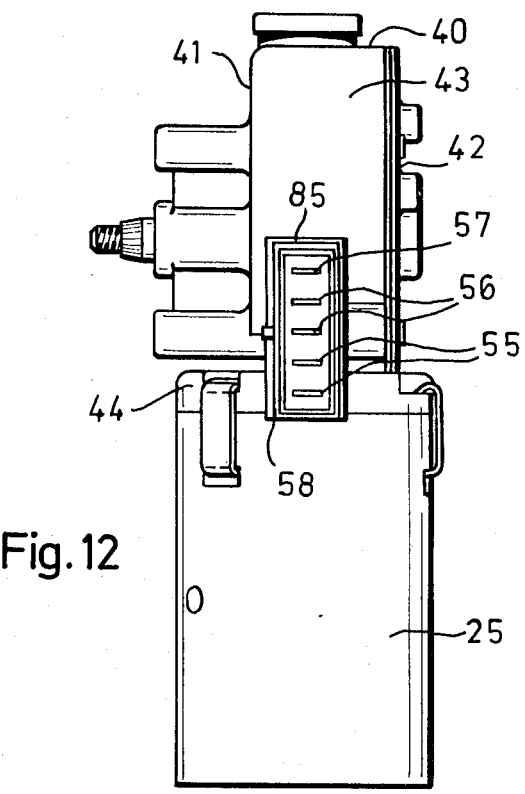
Figure 13:
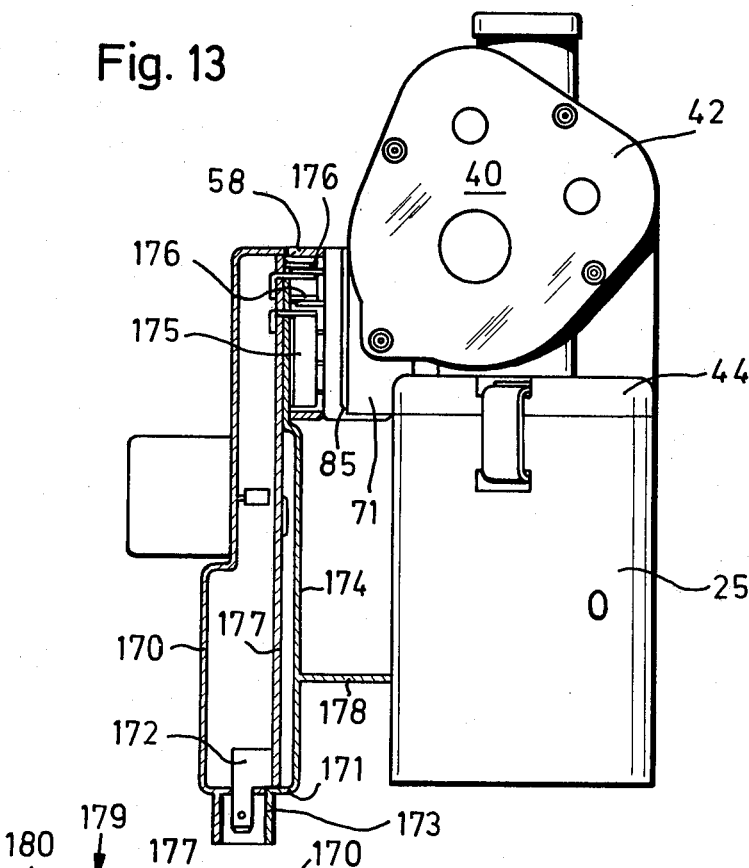
Figure 14:
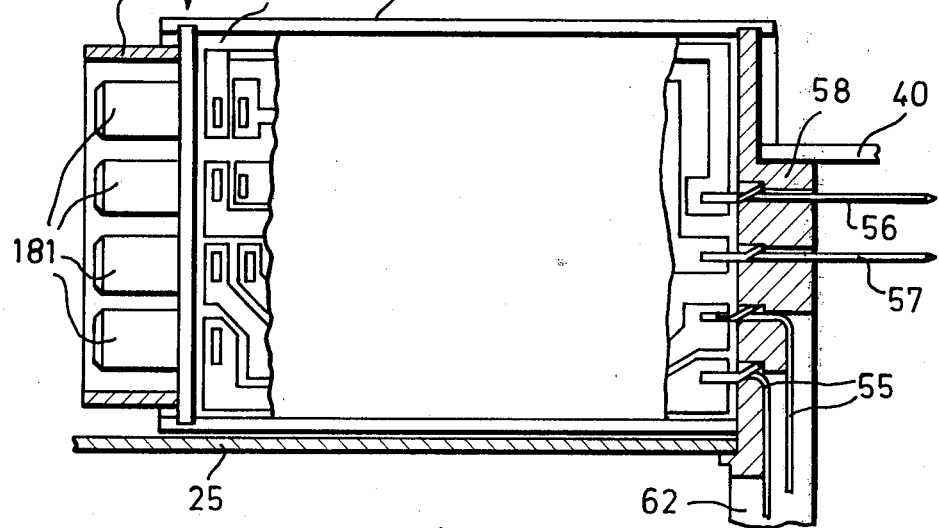
Figure 15:
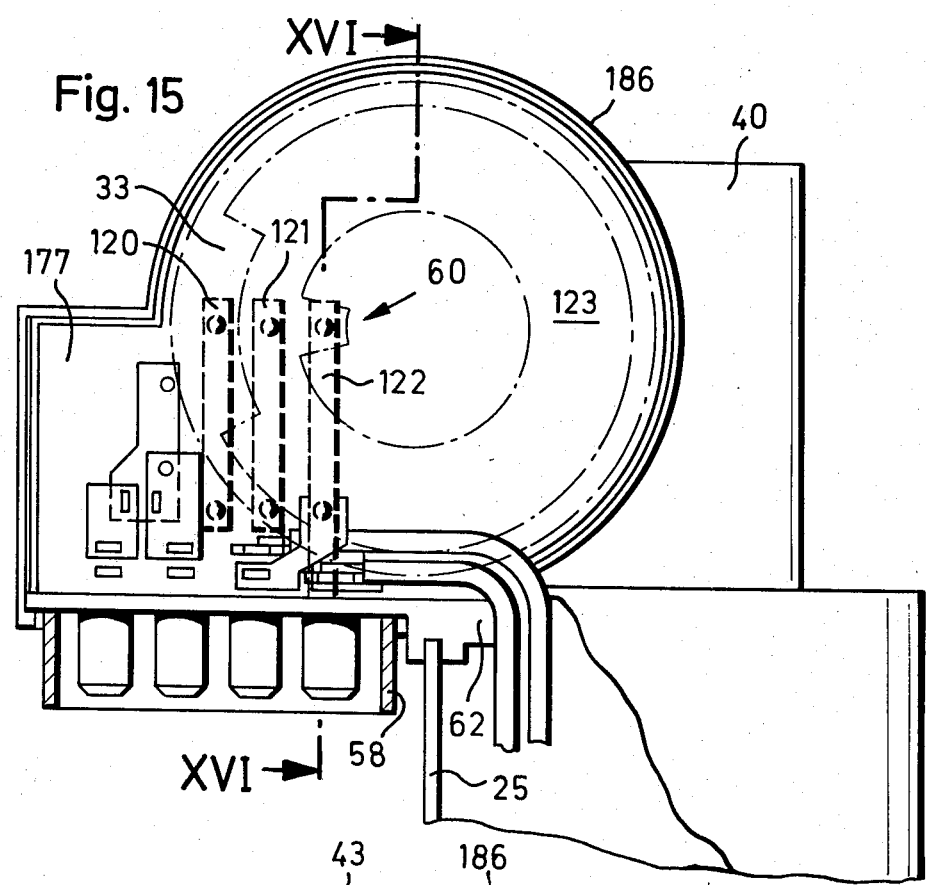
Figure 16:
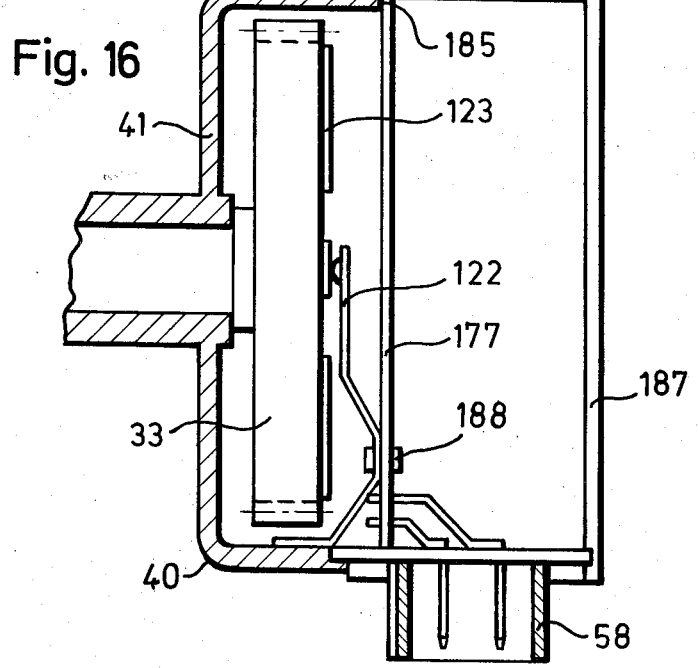
Figure 17:
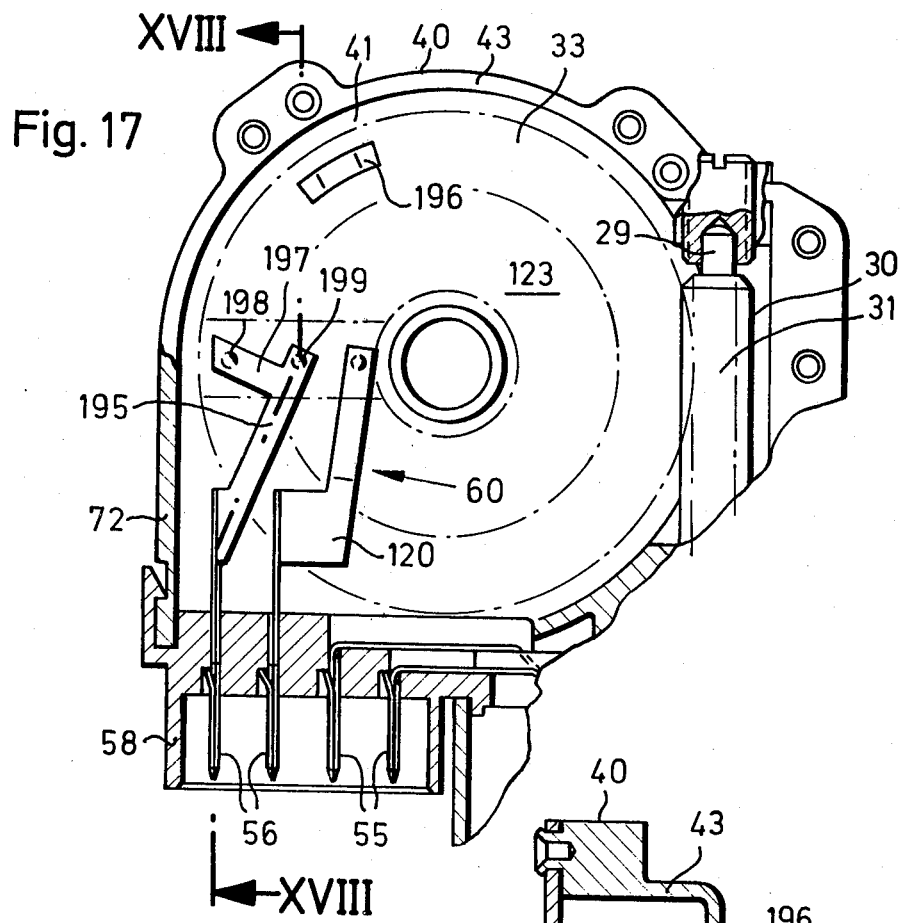
Figure 18:
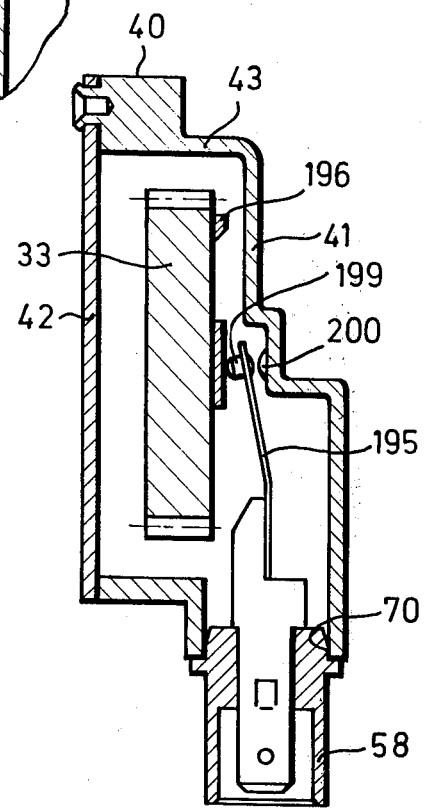

Some examples of an electric drive unit according to the invention are shown in the drawing. The invention is to be described in detail by way of the FIGS. in which FIG. 1 is a first embodiment, in which the plug housing is laterally arranged and two flat plugs are connecting brush holder plate and plug housing to one constructional unit, FIG. 2 is a view on the gear housing with mounted constructional unit in direction of arrow A of FIG. 1, FIG. 3 is an external view of the embodiment according to FIGS. 1 and 2, FIG. 4 is a second embodiment with a simple worm gear, in which the plug housing is arranged laterally of the motor housing and below the gear housing and is formed in one piece with the brush shoulder plate, FIG. 5 is a view on the gear housing with end shield and mounted constructional unit in direction of arrow B of FIG. 4, FIG. 6 is a view on the constructional unit in direction of arrow C of FIG. 4 in which all other parts of the drive unit have been omitted, FIG. 7 is an embodiment similar to that of FIG. 4, however with only two brush springs which are developed in one piece with corresponding plugs and with interference-suppression means, FIG. 8 is a top view on plug housing and brush holder plate of FIG. 7 in direction of the arrows D, FIG. 9 is a section taken on the line IX—IX of FIG. 7 with driven wheel, FIG. 10 is a fourth embodiment with a double worm gear drive and the driven wheel between the worm wheels on one side and the motor housing on the other side, FIG. 11 is a section taken on the line XI—XI of FIG. 10, FIG. 12 is an external view of the drive unit according to FIG. 10, FIG. 13 is a drive unit according to FIG. 12 with additional separate housing for an electronic circuit arrangement, FIG. 14 is a housing for the electronic circuit arrangement which is arranged laterally of the motor housing and below the gear housing, FIG. 15 is a drive unit in which the electronic circuit arrangement is accommodated in an enlarged gear housing, FIG. 16 is a section taken on the line XVI—XVI of FIG. 15, FIG. 17 is an embodiment with two brush springs, in which the one brush spring is controlled by a cam on the driven wheel as a changeover contact and taps off ground potential directly from the gear housing, FIG. 18 is a section through the version of FIG. 17 taken on the line XVIII—XVIII and FIG. 19 is an embodiment similar to that of FIG. 17, in which however the changeover contact directly acts upon the second switch contact.

The examples of an electric drive unit according to the invention shown in the FIGS. have a cup-shaped or tubular motor housing 25 belonging to an electric motor which as a whole is designated by 26. The armature shaft 27 of the motor on which the collector 28 is seated is lengthened beyond said collector and from its ends 29 is developed as a worm shaft 30 with one or two opposed worms 31. Each worm is mating with a worm wheel 33. In the drive units with simple worm-gear drive shown in the drawing the available worm wheel is also the driven wheel. In contrast theretwo in the double worm-gear drives a spur wheel 34 is connected with each worm wheel 33 in a manner protected against rotation. A common driven wheel 35 is driven by both spur wheels 34.

The gear with worm shaft 30 and worm wheel 33 or with worm shaft 30, worm wheels 33, spur wheels 34 and driven wheel 35 are located in a gear housing 40, which is also cup-shaped and has a bottom 41, a cover 42 and a round or rounded jacket 43. The gear housing 40 is flanged on the motor housing 25 by an end shield 44 receiving a bearing 45 for the armature shaft 27. The end shield is formed on the external jacket 43 of the gear housing. The end shield consists mainly of a plane plate 46 and a ring-shaped rim 47, whose front side 48 faces the front side 49 of the motor housing 25. The planes of the plate 46 and of the cover 42 or the bottom 41 of the gear housing are standing vertically on each other.

The electric connections of the drive unit are developed as flat plugs 55, 56 and 57 and usually in a line inserted in a plug housing 58. Thereby the plugs 55 serve as external connections for two brushes 59 via which the electric motor 26 can be energised in two speeds by an operating switch. The plug or the plugs 56 are external connections of a limit switch 60. Via the plug 56 ground potential is at least conducted to the drive unit. On the other hand it belongs to the limit switch 60 and on the other hand it is also directly or indirectly connected with a third brush of the collector 28. The three brushes 59 and 61 are arranged on a so-called brush holder plate 62 in brush holder 63. The brush holder plate 62 extends on the level of the end of the collector 28 facing the end shield 44 and vertically to the armature shaft 27. In its centre it has a circular opening 64 to be penetrated by the armature shaft 27 and to receive the collector 28.

In the drive units according to the invention the plug housing 58 and the brush holder plate 62 are firmly and rigidly connected and form a sole constructional unit, which is mounted as a whole. Thereby the plug housing 58 is inserted in an opening 70 in the jacket 43 of the gear housing 40. In order to ensure a close fit on the gear housing, an easy assembly and a reliable support walls 71 and 72 are formed on the rounded jacket 43 of the gear housing, whereby the dimensions of said walls are adapted in such a way that the rim of the opening 70 is located in a plane.

In the example shown in FIG. 1 to 3 the gear is a double worm-gear drive whose space requirement enables a gear housing 40 which to a far extent is located in the imagined lengthening of the motor housing 25. In order to provide that the radial extension of the drive unit is as small as possible the plug housing 58 is located laterally of the gear housing 40. Thereby its longitudinal direction corresponds to the longitudinal direction of the motor housing 25. Two walls 71 extending in parallel to the cover 42 are formed on the jacket 43 and on the end shield 44 and the wall 72 extending approximately tangentially from the jacket 43 and towards the motor housing 25 form the plane opening 70, which is rimless in downward direction for the plug housing 58 in a plane extending in parallel to the armature shaft. For this purpose the front faces 73 of the walls 71 end with the external face 74 of the wall 72. The lower edges 75 of the walls are also located in a plane and that in one on which the armature shaft is standing vertically.

In the embodiment described the plug housing 58 is partly arranged below the end shield 44. Therefore the motor housing 25 is left open in the elongation of the opening 70. In circumferential direction of the motor housing the recess 76 is smaller than the plug housing 58, on which therefore two lateral grooves are provided which on the front side are open in downward direction and whose width corresponds to the thickness of the motor housing 25. By the two ribs 78 on the underside 79 of the plug housing 58 a further groove 80 is formed, whereby the spacing of the ribs corresponds to the thickness of the motor housing 25, and said groove connects the two grooves 77 with each other. The plug housing 58 rests with a flange 85 against the front sides 75 and 73 of the walls 71 and against the external face 74 of the wall 72. The plug housing touches also the inside of the wall 72 with a rib 86, so that the lower end of this wall is also received in a groove 87.

The parking position switch 60 for the drive unit has two stationary contacts 90 and 91 which are rigid to a far extent and of which one is made in one piece with the plug 57 and one with one of the plugs 56. The stationary contact 90 is pressed against the gear housing 40 by a screw 92, so that the gear housing 40 thus reliably carries ground potential. Between the two stationary contacts 90 and 91 the changeover contact 93 is located, which has two contact rivets 94 staggered towards each other in its longitudinal direction and which is lengthened beyond the front contact rivet to form an operating stud 95 and is there controlled by a switching cam 96 of the driven wheel 35. The changeover contact 93 and the second plug 56 consist of one piece too.

The two flat plugs 55 are projecting into the interior of the motor housing 25, are resting with an extensive area of a lateral lug 100 above or below the brush holder plate 62 on said plate and are secured to it by tubular rivets 101. For securing the position they are in addition hooked in noses 102 in the brush holder plate 62. Each of the rivets 101 receive a terminal of the interference-suppression means 103 and 104. Other tubular rivets 104 serve for fastening and connecting the other terminals of the interference-suppression means and of the pigtails of the brushes 59. The pigtail 106 of the brush 61 is caulked with the gear housing 40. Thus no leads are necessary for a connection of the plugs 55, 56 and 57 with the parking position switch 60 and the brushes 59 and 61 of the electric motor 26.

In the pre-assembly the plugs 55 are at first secured on the brush holder plate 62 and are afterwards in their longitudinal direction inserted in the plug housing 58 and locked. Thereby a sole constructional unit is created consisting of plug housing 58 and brush holder plate 62. This constructional unit can then be slipped on the gear housing 40 in direction of the armature shaft 27. The brush holder plate 62 is thereby held on the end shield 44 via rubber stoppers 107. Then the armature of the electric motor 26 is inserted and the motor housing 25 is slipped over it. Thereby the constructional unit is finally secured between the gear housing 40 and the motor housing 25. By the grooves 77, 80 and 87 as well as by the flange 85 on the one hand the drive unit is provided with a good packing towards the outside and on the other hand a close fit and a firm hold of the constructional unit is achieved in longitudinal direction of the plugs. The latter is above all of importance for the assembly or disassembly of a socket housing.

The gear of the embodiment shown in FIGS. 4 to 6 is a simple worm-gear drive with a worm 31 and a worm wheel 33 as a driven wheel. This results in such a constellation that the gear housing 40 projects on one side far over the circumference of the motor housing 25. In order to avoid that such a drive unit is furthermore extensively enlarged in this direction, the plug housing 58 is now substantially arranged laterally of the motor housing 25 and below the gear housing 40. Thereby the flat plugs 55, 56, and 57 extend in parallel to the motor housing 25. Besides the mid-plane of the plug housing 58, namely the plane defined by the plugs, is parallel to the cover 42 and to the bottom 41 of the gear housing 40. On the jacket 43 of the gear housing 40 walls 71 and 72 are formed in a similar manner as in the first embodiment. Now, however, in accordance with the different position of the plug housing 58 the walls 71 and 72 are extending equally far in downward direction towards the motor housing 25. Thus the front edge 75 of the walls 71 and the front face 110 of the wall 72 are located in a plane extending vertically to the armature shaft 27 and form the rim of the plane opening 70, against which the plug housing 58 rests with the flange 85.

On its side 111 not facing the motor housing the plug housing 58 is locked with the gear housing 40 or more exactly with the wall 72 of the gear housing 40. This is effected by a locking spring 112 which is formed on the outside of the flange 85 and is provided with a detent 113 and by a locking recess 114 in the wall 72 into which the detent 113 is locked. The wall 72 is partly received in the groove between the locking spring 112 and the side 111 of the plug housing 58.

The parking position switch 60 of the drive unit according to FIGS. 4 to 6 has three brush springs 120, 121 and 122 and a conductive strip 123 drawn in broken lines which rotates with the driven wheel 33. The brush springs 120 and 121 are directly caulked with the flat plugs 56, the brush spring 122 with the flat plug 57.

In the second embodiment the plug housing 58 and the brush holder plate 62 are formed of plastic material in one piece and are connected with each other via the recess 123 in the end shield 44. With its rim 124 the brush holder plate 62 is located between the front side 49 of the motor housing 25 and the front side 48 of the end shield 44. There it has a step-like profile, so that a good packing and a firm seat are effected.

The pigtail 106 of the brush 61 is directly welded with the plug 57, the pigtails 125 of the brushes 59 are directly welded with one each of the plugs 55. The brush holders 63 are located on the side of the plate 62 facing the armature of the motor and are formed in one piece with said plate. In order to to make the pigtails as short as possible and to arrange them advantageously the slot 126 through which a pigtail leaves the brush holder, is provided in the plate 62 of at least some brush holders, so that the corresponding pigtails leave the brush holder towards the end shield 44. In the present example this is valid for the pigtail 106 and one of the pigtails 125. In order to avoid a short-circuit with the pigtail 106 the other pigtail 125 is conducted through a bore in the plate 62 to the side not facing the end shield 44 and and through a slot 126 enters from there into the corresponding brush holder 63. In order to secure the pigtails 106 and 125 in their positions and to exclude a mutual contact they are secured in clamps 128 on the brush holder plate 62 and clipsed in staggered slots 129 of cross-pieces 130 in the plug housing 58, whereby said slots are differently deep.

The embodiment according to FIGS. 7 to 9 is very similar to the drive unit according to FIGS. 4 to 6. Therefore corresponding parts have the same reference numerals. Below above all the differences are described.

In the now described example the parking position switch 60 has only two brush springs 121 and 122, which can be connected in an electrically conductive manner by the conductive strip 123. If no motor current flows through the parking position switch 60, but only a control signal is evaluated there, which is given by the switch in the parking position, one brush spring can be saved as a consequence. The brush spring 121 is developed in one piece with the flat plug 56, the brush spring 122 with the flat plug 57. In order to conduct ground potential to the gear housing 40 and to the motor housing the foot 140 of the brush spring 122 is fastened onto the gear housing by means of a rivet 141.

Because in comparison to the example according to FIGS. 4 to 6 now one plug less has to be accomodated in the plug housng 58, the plug housing becomes shorter in its longitudinal direction, so that its side not facing the motor housing is no longer so far away from the motor housing 25. Therefore the wall 72 must not be bent away from the jacket 43, but can be tangentially conducted away directly from the jacket 43 in longitudinal direction of the motor housing 25.

Like in the version according to FIGS. 1 to 3 in the version according to FIGS. 7 to 9 there are also provided interference-suppression means, which are however directly secured on the flat plugs 55. For this purpose the flat plugs are rectangularly bent in direction to the motor housing 25 at various levels within the plug housing 58. From opposed sides the bent lugs 142 narrow to less than half of the flat plug width and are bent downwards through an opening 143 in the brush holder plate 62 and end at the same level. On their narrowed portion they are separated from one another by a partition 144 spanning the opening 143. The interference-suppression means 103 and 104 are fastened on the lugs 142 by crimp connections 145. In the same manner the pigtails of motors which are not interference-free can be fastened on the flat plugs 55. The pigtail 106 is caulked with the gear housing 40, thus connected with the plug 57 via said housing and via the rivet 141.

From FIG. 9 it can also be seen that the bottom 41 of the gear housing 40 has a recess 146, in order to provide sufficient space for the flat plugs 56 and 57 and the plug housing 58 within the gear housing 40. The one wall 71 is thereby an elongation of the bottom 147 of the recess 146.

In FIG. 10 to 13 again a drive unit according to the invention comprising a double worm-gear drive is shown, and that with an externally toothed driven wheel 35 on which a conductive strip 123 is located just as in the two previous examples, which conductive strip forms the parking position switch together with the three brush springs 120, 121 and 122. The brush springs are made in one piece with the corresponding flat plugs. The brush spring 122 is again riveted with the housing 40 with the rivet 141. In order to reach an advantageous correspondence between the conductive strip 123 and the brush spring 120 to 122 the common driven wheel is now arranged on the side of a plane defined by the two shafts 155 of the worm wheels 33, on which plane the plug housing 58 and the brush holder plate 62 are also located. Furthermore the plug housing 58 is braced on the gear housing 40 on the side of the worm shaft 30, on which most of the driven wheel 35 is located too.

Like in the first example the longitudinal direction of the plug housing 58 extends in longitudinal direction of the motor housing 25. However said plug housing is completely located on the side of the brush holder plate 52 not facing the motor housing 25, so that no recess in the motor housing 25 is necessary, because the brush holder plate 62 is located above the front edge 49 of the housing 25. A flange 85 serves again as a stop in direction of assembly of a socket housing.

In addition to the brush holders 63 the brush holder plate 62 is again provided with interference-suppression means 103 and 104, which are directly connected to the plugs 55 with a terminal 156 or 157 by crimp connections. The other terminal 158 of the coils 103 is clamped with a pigtail 125 and inserted in a hollow pin 159 of the brush holder plate 62, so that a reliable held is provided.

The other terminal 160 of the capacitors 104 is caulked with the gear housing 40 as well as the pigtail 106.

Towards the plug housing 58 the brush holder plate 62 has a recess 161 beginning at its central opening 64; said recess is divided in two slots 163 by a partition 162 directed vertically to the plate 62. The partition 162 serves above all for insulating the interference-suppression means 103 and 104 belonging to different brushes. The open recess 161 permits at first to mount the interference-suppression means 10 and 103, which are located on different sides of the brush holder plate 62, on the corresponding plugs and then secure the plug with the interference-suppression means on plug housing 58 and plate 62.

FIG. 13 shows a drive unit according to FIGS. 10 to 12, which, in contrast thereto, is enlarged by a housing 170, in which an electronic circuit arrangement belonging to the electric motor can be accomodated.

In order to need as little space as possible transversally to the motor housing 25, the housing is as flat as possible in this direction, whereas in longitudinal direction of the motor housing 25 it extends from the plug housing 58 to the end of the motor housing 25. In its lower front side 171 several plugs 172 are fastened whose outer tags are surrounded by a frame 173. There the housing 170 is developed as a plug housing. On the part of its broadside 174 adjacent to the plug housing 58 and facing the motor housing 25 the housing 170 has the shape of a socket housing 175, in which in accordance with the position and number of plugs in the plug housing 58 several receptacles 176 are arranged. The plugs 172 and the receptacles 176 are in direct conductive connection with conductive strips on the printed circuit board 177, which is flatly located in the housing 170 and on which the various components of the electronic circuit arrangement are fixed and can be interconnected by conductive strips. For the stabilisation of its position the housing 170 is supported on the motor housing 25 by a rib 178.

The advantage of a drive unit with a separate housing for the electronic circuit arrangement as shown in FIG. 13 is above all to be seen in the fact that the electronic circuit arrangement can be easily exchanged.

In the embodiment according to FIG. 14, too, a housing 170 is provided for an electronic circuit arrangement outside of the motor and gear housings. Thereby the constellation of motor housing 25, gear housing 40 and plug housing 58 with brush holder plate 62 is the same as in the drive unit according to FIG. 7. On grounds of space it is therefore of advantage, if the housing 170, in downward direction adjacent to the plug housing 58, is located beside the motor housing 25 and below the gear housing 40. For a reliable contact-making and a firm hold the plugs 55, 56, and 57 are put in slots of the printed circuit board 177 and soldered with it. On the side 179 facing the plug housing 58 the flat plugs 181, which are arranged in a plug housing 180, are also soldered with the printed circuit board and the electric drive unit can be connected to an electric network. During the assembly at first the printed circuit board 177 with the plugs 181 and the plug housing 180 is secured to the plugs of the plug housing 58. Only thereafter the housing 170 is slipped over the plug housing 180 and the printed circuit board.

The FIGS. 15 and 16 show an electric drive unit whose electronic circuit arrangement is accomodated inside the gear housing 40. For this purpose a printed circuit board 177 is located in parallel to the driven wheel 33 in a groove 185 at the front side 186 of the jacket 43. On the side of the printed circuit board 177 not facing the driven wheel 33 a space closed to the outside is created for the electric components by the cover 187. On the other side of the printed circuit board 177, between the latter and the driven wheel 33, the three brush springs 120, 121 and 122 of the parking position switch 60 are located, to which the conductive strip 123 belongs as well. The brush springs are riveted with the printed circuit board 177. The brush spring 122 is elongated beyond the rivet 188, bent away from the printed circuit board 177 and rests resiliently against the jacket 43 of the gear housing 40, to which thus ground potential is conducted.

In FIGS. 17 and 18 and in FIG. 19 two embodiments of a drive unit according to the invention are shown, in which the gear housing 40 is connected to earth in that it is for instance conductively secured directly on the vehicle body. Therefore a connection for the earth potential to the parking position switch via a switch contact or a switching spring can be saved, when a resilient switch contact 195 of the switch, controlled by a cam 196 moved by the driven wheel 33, makes contact with the gear housing 40. Apart from the parking position switch 60 the versions according to FIGS. 17 to 19 completely correspond to the drive unit of FIGS. 7 to 9. Therefore only the special design of the parking position switch is described in this connection.

In contrast to the example of FIGS. 7 to 9 the flat plug 57 included in these versions is saved, because the gear housing 40 is directly applied to earth potential. Instead of the flat plug 57 there is a flat plug 56, which is to be connected with the positive terminal of a voltage source. The second flat plug 56 is retained. The switching spring 195 is formed in one piece with it. A second switch contact 120 consists of one piece with the second flat plug 56.

In the example according to FIGS. 17 and 18 the two contacts 195 and 120 are formed as brush springs. The electric connection between them can be effected via a conductive strip 123 which has the shape of a simple ring. The brush spring 195 has an extension arm 197 which projects rectangularly from said spring towards the rim of the driven wheel 33; into said extension arm a curvature 198 is pressed which is directed towards the driven wheel. The curvature 198 and the cam 196 have the same distance from the centre of the driven wheel 33 so that, when the driven wheel 33 rotates, the cam 196 runs below the curvature 198, removes the contact rivet 199 of the brush spring 195 from the conductive strip and presses it against a wart 200 on the gear housing. Thus the switch contact 195 has changed over from positive potential to negative potential. If the operating switch for the drive unit is in the off-position the electric motor is electro-dynamically braked. Apart from that the changeover operation has no effect. Thus in a parking position switch according to FIGS. 17 and 18 a brush spring is saved and the conductive strip can be simplified. Thus the present complicated adherence to tolerances and the angle definition is avoided. The angle within which the spring 195 changes the potentials only amounts to 5° to 6°. The overall switching-off angle can be dimished, so that the constancy of the parking position is improved.

In the embodiment according to FIG. 19 the switching spring 195 directly acts upon the switch contact 120, so that a conductive strip is no longer necessary. Now the switch contact 120 can be rigid to a far extent. The changeover contact 195 is equipped with a second extension arm 201 in addition to the first one and, in dependence on how one looks at it, said second extension arm extends as far as below or above the switch contact 120 and has a curvature 202 directed towards said switch contact. The curvature 198 of the extension arm 197 points into the opposite direction to the bottom of the gear housing. This time the cam 196 is arranged in such a way that it meets the switch contact 195 approximately in the middle between the two extension arms. Normally the extension arm 201 rests on the contact 120, thus on the positive terminal of a voltage source. If however the cam 196 is moved to the changeover contact 195 with a turn of the driven wheel 33 the extension arm 201 is at first lifted from the contact 120 and then the extension arm 197 is pressed against the gear housing. In the off-position of the operating switch this results in a braking of the motor.

It goes without saying that in a different constellation of driven wheel and switch contacts the earth potential can be tapped off too from the cover of the gear housing. The wart 200 can be pressed into a steel cover. It is also possible to use a pressed-in copper rivet instead of the wart.

We claim:

1. An electric drive unit for use with windshield wipers of a motor vehicle, comprising: an electric motor with a brush holder plate accomodated in a cup-shaped housing, a gear housing closing a front face of the drive unit by means of an end shield, and a plug housing in which the plugs which are connected in an electrically conductive manner with the switch contacts of a limit switch and the brushes of the electric motor are secured, wherein the plug housing (58) and the brush holder plate (62) are one unitary unit, wherein the jacket (43) of the gear housng (40) has an opening (70) in which the plug housing (58) is received, wherein the end shield (44) has a rimless recess opening towards the motor housing (25) through which the plug housing and brush holder plate are mounted in the gear housing (40) and therein interconnected and means for mounting the motor housing (25) to the end shield (44) and against the plug housing (58) whereby the unitary unit is secured between the motor housing (25) and gear housing (40).

2. An electric drive unit according to claim 1, wherein the opening (70) in the gear housing (40) and the recess in the end shield (44) are a single opening (70) which is rimless towards the motor housing (25).

3. An electric drive unit according to claim 1 or 2, wherein at least one plug (55) is secured on the brush holder plate (62) and in the plug housing (58) and thereby forms a rigid connection between brush holder plate (62) and plug housing (58).

4. An electric drive unit according to claim 3, wherein the plug (55) is secured on the brush holder plate (62) by a tubular rivet (101) into which a connecting wire to a brush of the motor is inserted.

* * * * *